United States Patent
Shah et al.

(10) Patent No.: US 10,248,333 B1
(45) Date of Patent: Apr. 2, 2019

(54) WRITE DISTRIBUTION TECHNIQUES FOR TWO-TERMINAL MEMORY WEAR LEVELING

(71) Applicant: Crossbar, Inc., Santa Clara, CA (US)

(72) Inventors: Ruchirkumar Shah, San Jose, CA (US); Mehdi Asnaashari, Danville, CA (US)

(73) Assignee: CROSSBAR, INC., Santa Clara, CA (US)

( * ) Notice: Subject to any disclaimer, the term of this patent is extended or adjusted under 35 U.S.C. 154(b) by 22 days.

(21) Appl. No.: 15/426,298

(22) Filed: Feb. 7, 2017

(51) Int. Cl.
  *G06F 3/06* (2006.01)
  *G06F 12/1009* (2016.01)

(52) U.S. Cl.
  CPC .......... *G06F 3/0616* (2013.01); *G06F 3/0631* (2013.01); *G06F 3/0638* (2013.01); *G06F 3/0653* (2013.01); *G06F 3/0679* (2013.01); *G06F 12/1009* (2013.01); *G06F 2212/65* (2013.01)

(58) Field of Classification Search
  CPC .. G06F 12/0246; G06F 3/0679; G06F 3/0688; G06F 3/0616; G06F 3/064; G06F 3/061; G06F 2212/7211; G06F 2212/7201; G06F 2212/2022; G06F 2212/214; G06F 2212/202; G06F 3/0635; G06F 3/0633; G06F 3/0631; G06F 12/1009; G06F 2212/65
  See application file for complete search history.

(56) References Cited

U.S. PATENT DOCUMENTS

| | | | |
|---|---|---|---|
| 2004/0083335 A1* | 4/2004 | Gonzalez | G06F 12/0246 711/103 |
| 2007/0208904 A1* | 9/2007 | Hsieh | G06F 12/0246 711/103 |
| 2009/0248962 A1* | 10/2009 | Kim | G06F 12/0246 711/103 |
| 2010/0037001 A1 | 2/2010 | Langlois et al. | |
| 2011/0231610 A1 | 9/2011 | Yano et al. | |
| 2012/0311238 A1* | 12/2012 | Im | G06F 12/0638 711/103 |
| 2013/0051123 A1* | 2/2013 | Lee | G11C 8/00 365/148 |
| 2014/0089565 A1* | 3/2014 | Lee | G06F 3/061 711/103 |
| 2014/0095827 A1 | 4/2014 | Wei et al. | |

(Continued)

OTHER PUBLICATIONS

Office Action dated Aug. 7, 2018 for U.S. Appl. No. 15/428,721, 45 pages.

*Primary Examiner* — Hiep T Nguyen

(74) *Attorney, Agent, or Firm* — Wegman, Hessler & Vanderburg

(57) ABSTRACT

One potential result of differing characteristics for certain two-terminal memory (TTM) is that memory management techniques, such as logical-to-physical (L2P), can differ as well. Previous memory management techniques do not adequately leverage the advantages associated with TTM. For example, by identifying and leveraging certain advantageous characteristics of TTM, L2P tables can be designed to be smaller and more efficient. Moreover, other memory management operations such as wear-leveling, recovery from power loss, and so forth, can be more efficient.

20 Claims, 10 Drawing Sheets

(56) References Cited

U.S. PATENT DOCUMENTS

| | | | |
|---|---|---|---|
| 2014/0181434 A1* | 6/2014 | Chau | G06F 12/16 |
| | | | 711/162 |
| 2015/0254177 A1 | 9/2015 | Ikeda et al. | |
| 2016/0048448 A1 | 2/2016 | Kwon et al. | |
| 2016/0118136 A1 | 4/2016 | Tseng et al. | |
| 2017/0242583 A1 | 8/2017 | Yang et al. | |
| 2017/0293525 A1* | 10/2017 | Kanno | G06F 11/1068 |

* cited by examiner

EXAMPLE WRITE COUNT DATA
602

604 → WCDS
606 → 10,502

608 → TIDS
610 → 0

EXAMPLE STATIC WEAR LEVELING TABLE
612

| WL TIER (e.g., X) | HIGH THRESHOLD (e.g., $HV_X$ * GS 402) | LOW THRESHOLD (e.g., $LV_X$ * GS 402) |
|---|---|---|
| 0 | 40,000 * 256 | 25,000 * 256 |
| 1 | 60,000 * 256 | 48,000 * 256 |
| 2 | 70,000 * 256 | 60,000 * 256 |
| 3 | 80,000 * 256 | 70,000 * 256 |
| 4 | 90,000 * 256 | 82,000 * 256 |
| 5 | 95,000 * 256 | 90,000 * 256 |

WRITE DISTRIBUTION TECHNIQUES FOR TWO-TERMINAL MEMORY WEAR LEVELING

INCORPORATION BY REFERENCE

The following are hereby incorporated by reference in their entireties and for all purposes. U.S. patent application Ser. No. 14/588,185, filed Dec. 31, 2014, U.S. patent application Ser. No. 11/875,541 filed Oct. 19, 2007, U.S. patent application Ser. No. 12/575,921 filed Oct. 8, 2009, and U.S. patent application Ser. No. 14/636,363 filed Mar. 3, 2015.

TECHNICAL FIELD

This disclosure generally relates to logical-to-physical (L2P) translation techniques and/or wear leveling techniques that leverage L2P translation in connection with two-terminal memory such as resistive-switching memory.

BACKGROUND

Two-terminal, resistive-switching memory represents a recent innovation within the field of integrated circuit technology. While much of resistive-switching memory technology is in the development stage, various technological concepts for resistive-switching memory have been demonstrated by the inventor(s) and are in one or more stages of verification to prove or disprove associated theories or techniques. The inventor(s) believe that resistive-switching memory technology shows compelling evidence to hold substantial advantages over competing technologies in the semiconductor electronics industry.

The inventor(s) believe that resistive-switching memory cells can be configured to have multiple states with distinct resistance values. For instance, for a single bit cell, the restive-switching memory cell can be configured to exist in a relatively low resistance state or, alternatively, in a relatively high resistance state. Multi-bit cells might have additional states with respective resistances that are distinct from one another and distinct from the relatively low resistance state and the relatively high resistance state. The distinct resistance states of the resistive-switching memory cell represent distinct logical information states, facilitating digital memory operations. Accordingly, the inventor(s) believe that arrays of many such memory cells, can provide many bits of digital memory storage.

The inventor(s) have been successful in inducing resistive-switching memory to enter one or another resistive state in response to an external condition. Thus, in transistor parlance, applying or removing the external condition can serve to program or de-program (e.g., erase) the memory. Moreover, depending on physical makeup and electrical arrangement, a resistive-switching memory cell can generally maintain a programmed or de-programmed state. Maintaining a state might require other conditions be met (e.g., existence of a minimum operating voltage, existence of a minimum operating temperature, and so forth), or no conditions be met, depending on the characteristics of a memory cell device.

The inventor(s) have put forth several proposals for practical utilization of resistive-switching technology to include transistor-based memory applications. For instance, resistive-switching elements are often theorized as viable alternatives, at least in part, to metal-oxide semiconductor (MOS) type memory transistors employed for electronic storage of digital information. Models of resistive-switching memory devices provide some potential technical advantages over non-volatile FLASH MOS type transistors.

In light of the above, the inventor(s) desire to continue developing practical utilization of resistive-switching technology.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

The subject disclosure provides for a memory device comprising a table storage memory that stores a logical-to-physical (L2P) table. The L2P table can map a logical group identifier (LGI) to a physical group identifier (PGI). The PGI can identify a physical group (PG) among PGs of a non-volatile memory comprising non-volatile two-terminal memory. The PGs can respectively comprise multiple physical block addresses (PBAs) that address respective blocks of memory with each block being one or more pages having physical page address (PPA).

The memory device can further comprise a controller that can be operatively coupled to the table storage memory and the non-volatile memory. The controller can facilitate performance of operations that provide a wear leveling procedure. Such operations can comprise, e.g., the following: determining that a block of data has been written to a PBA of the multiple PBAs; or written to a PPA of the multiple PPAs. Determining the PG that comprises the PBA and/or the PPA; and updating write counter data associated with the PG. The write counter data can comprise a write counter data structure (WCDS) with a value stored therein. The value can be representative of a count of writes to the PG of the table storage memory. The updating can comprise incrementing the WCDS value.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

DETAILED DESCRIPTION

Introduction to Two-Terminal Memory

Figure 1:
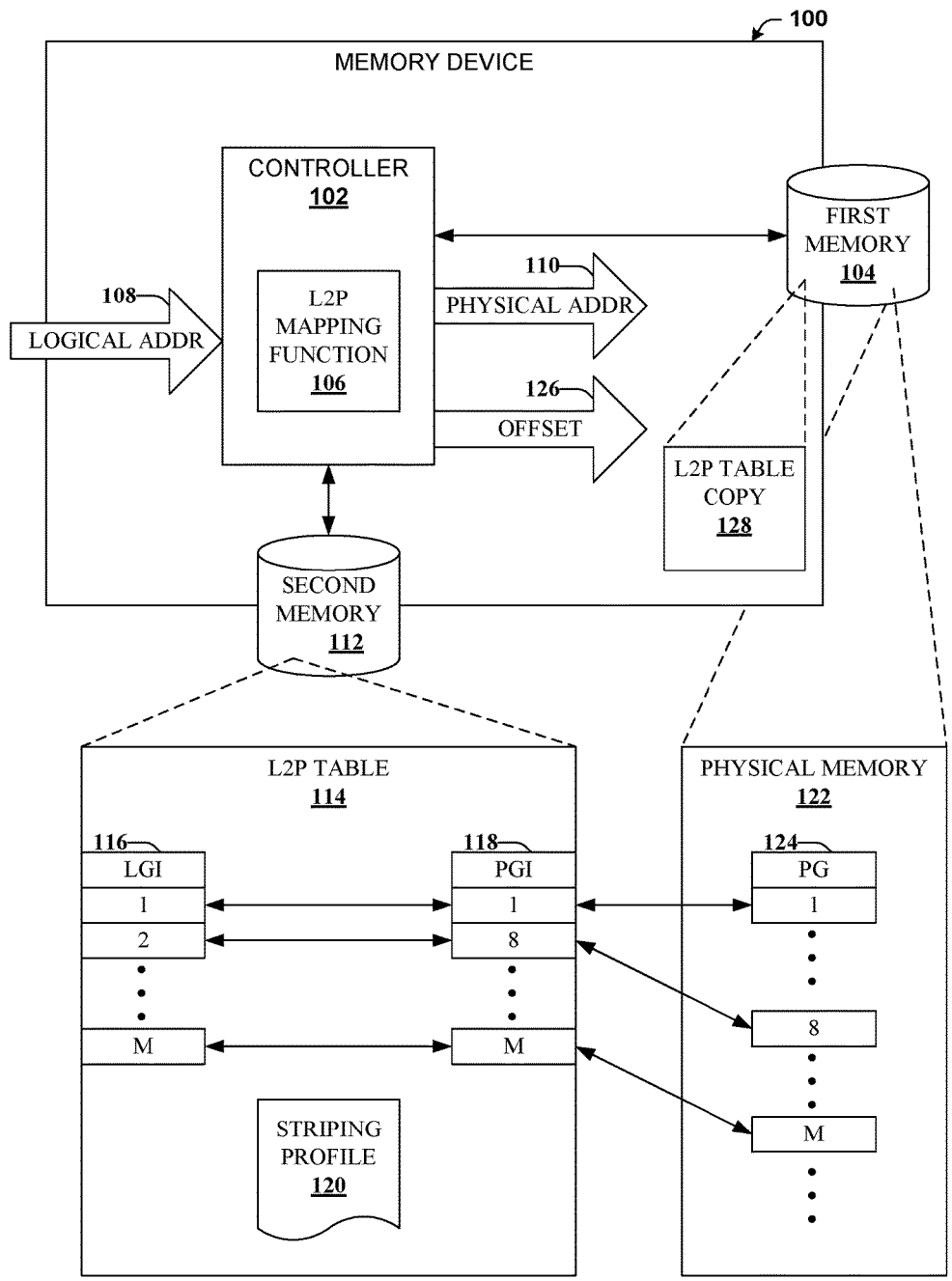
FIG. 1 illustrates a block diagram of a system that provides for a thin and efficient logical-to-physical (L2P) mapping in accordance with certain embodiments of this disclosure.

This disclosure relates to two-terminal memory cells employed for digital or multi-level information storage. In some embodiments, the two-terminal memory cells can include a resistive technology, such as a resistive-switching two-terminal memory cell. Resistive-switching two-terminal memory cells (also referred to as resistive-switching memory cells or resistive-switching memory), as utilized herein, comprise circuit components having conductive contacts (e.g., electrodes or terminals) with an active region between the two conductive contacts. The active region of the two-terminal memory device, in the context of resistive-switching memory, exhibits a plurality of stable or semi-stable resistive states, each resistive state having a distinct electrical resistance. Moreover, respective ones of the plurality of states can be formed or activated in response to a suitable electrical signal applied at the two conductive contacts. The suitable electrical signal can be a voltage value, a current value, a voltage or current polarity, or the like, or a suitable combination thereof. Examples of a resistive switching two-terminal memory device, though not exhaustive, can include a resistive random access memory (RRAM), a phase change RAM (PCRAM) and a magnetic RAM (MRAM). In various embodiments, one or more additional layers (e.g., blocking layer(s), adhesion layer(s), tunneling layer(s), ohmic contact layer(s), etc., or a suitable combination thereof) can be provided as part of the resistive-switching two-terminal memory cells, whether between the two conductive contacts, external to the conductive contacts or a suitable combination thereof.

Embodiments of the subject disclosure can provide a filamentary-based memory cell. In some embodiments, the filamentary-based memory cell includes a non-volatile memory device, whereas other embodiments provide a volatile selector device in electrical series with the non-volatile memory device. In further embodiments, both the volatile selector device and the non-volatile memory device can be filamentary-based devices, though the subject disclosure is not limited to these embodiments.

One example of a filamentary-based device can comprise: a conductive layer (e.g., comprising, e.g., TiN, TaN, TiW, metal compounds), an optional interface layer (e.g., doped p-type (or n-type) silicon (Si) bearing layer (e.g., p-type or n-type polysilicon, p-type or n-type polycrystalline SiGe, etc.)), a resistive switching layer (RSL) and an active metal layer capable of being ionized. Under suitable conditions, the active metal layer can provide filament forming ions to the RSL. In such embodiments, a conductive filament (e.g., formed by the ions) can facilitate electrical conductivity through at least a subset of the RSL, and a resistance of the filament-based device can be determined by a tunneling resistance (or, e.g., ohmic contact resistance) between the filament and the conductive layer. To reverse electrical conductivity resulting from the conductive filament, whether for the volatile selector device or the non-volatile memory device (with the exception of one-time programmable memory devices), the filament can be deformed. In some embodiments, deformation of the filament can comprise the particles (e.g., metal ions)—trapped within the defect locations—becoming neutral particles (e.g., metal atoms) in absence of the bias condition that have a high electrical resistance. In other embodiments, deformation of the filament can comprise dispersion (or partial dispersion) of the particles within the RSL, breaking a conductive electrical path provided by the filament in response to the bias condition. In still other embodiments, deformation of the filament can be in response to another suitable physical mechanism, or a suitable combination of the foregoing.

Generally, deformation of a conductive filament results from a change in the bias conditions to a second set of bias conditions. The second set of bias conditions can vary for different devices. For instance, deformation of a conductive filament formed within the volatile selector device can be implemented by reducing an applied bias below a formation magnitude (or small range of magnitudes, such as a few tens of a volt) associated with filament formation within the volatile selector device. Depending on the embodiment, a conductive filament can be created within a volatile selector device in response to a positive bias (e.g., forward bias) or in response to a negative bias (e.g., reverse bias), and deformation of the filament can occur in response to a suitable lower-magnitude positive bias or a suitable lower-magnitude negative bias, respectively. See U.S. patent application Ser. No. 14/588,185 filed Dec. 31, 2014 commonly owned by the assignee of the present application, and incorporated by reference herein in its entirety and for all purposes. In contrast, deformation of a conductive filament formed within the non-volatile memory device can be implemented by providing a suitable erase bias (e.g., a reverse bias), having opposite polarity from a program bias (e.g., forward bias) utilized to form the conductive filament within the non-volatile memory device.

In various embodiments of a memory cell of the present disclosure, a conductive layer may include titanium nitride (TiN), tantalum nitride (TaN), tungsten (W) or the like. The RSL (which can also be referred to in the art as a resistive switching media (RSM)) can comprise, e.g., an undoped amorphous Si layer, a semiconductor layer having intrinsic characteristics, a silicon nitride (e.g. SiN, Si3N4, SiNx, etc.), a Si sub-oxide (e.g., SiOx wherein x has a value between 0.1 and 2), a Si sub-nitride, a metal nitride, a non-stoichiometric silicon compound, and so forth. Other examples of materials suitable for the RSL could include $Si_XGe_YO_Z$ (where X, Y and Z are respective suitable positive numbers), a silicon oxide (e.g., $SiO_N$, where N is a suitable positive number), an undoped amorphous Si (a-Si), amorphous SiGe (a-SiGe), $TaO_B$ (where B is a suitable positive number), $HfO_C$ (where C is a suitable positive number), $TiO_D$ (where D is a suitable number), $Al_2O_E$ (where E is a suitable positive number) and so forth, or a suitable combination thereof. In various embodiments, the RSL includes a number of material voids or defects to trap or hold particles in place, in the absence of an external program stimulus causing the particles to drift within the RSL and form the conductive filament. For the non-volatile memory device then, the particles can remain trapped in the absence of the external program stimulus, requiring a suitable reverse bias (e.g., a negative polarity erase stimulus) to drive the particles out of the voids/defects, or otherwise break continuity of the conductive filament, thereby deforming the conductive filament.

The contact material layer can be comprised of any suitable conductor, such as a conductive metal, a suitably doped semiconductor, or the like. Where utilized, the contact material layer can be employed to provide good ohmic contact between the RSL and a metal wiring layer of an associated memory architecture. In some embodiments, the contact material layer can be removed and the RSL can be in physical contact with a metal wiring layer. Suitable metal wiring layers can include copper, aluminum, tungsten, platinum, gold, silver, or other suitable metals, suitable metal alloys, or combinations of the foregoing. In further embodiments, a diffusion mitigation layer or adhesion layer can be provided between the RSL and the metal wiring layer (or between the RSL and the contact material layer).

Examples of the active metal layer can include, among others: silver (Ag), gold (Au), titanium (Ti), titanium nitride (TiN) or other suitable compounds of titanium, nickel (Ni), copper (Cu), aluminum (Al), chromium (Cr), tantalum (Ta), iron (Fe), manganese (Mn), tungsten (W), vanadium (V), cobalt (Co), platinum (Pt), and palladium (Pd), a suitable nitride of one or more of the foregoing, or a suitable oxide of one or more of the foregoing. Other suitable conductive materials, as well as compounds or combinations of the foregoing or similar materials can be employed for the active metal layer in some aspects of the subject disclosure. In some embodiments, a thin layer of barrier material composed of Ti, TiN, or the like, may be disposed between the RSL and the active metal layer (e.g., Ag, Al, and so on). Details pertaining to additional embodiments of the subject disclosure similar to the foregoing example(s) can be found in the following U.S. patent applications that are licensed to the assignee of the present application for patent: application Ser. No. 11/875,541 filed Oct. 19, 2007, application Ser. No. 12/575,921 filed Oct. 8, 2009, and the others cited herein, each of which are incorporated by reference herein in their respective entireties and for all purposes.

In response to a suitable program stimulus (or set of stimuli) a conductive path or a filament of varying width and length can be formed within a relatively high resistive portion of a non-volatile memory device (e.g., the RSL). This causes a memory cell associated with the non-volatile memory device to switch from a relatively high resistive state, to one or more relatively low resistive states. In some resistive-switching devices, an erase process can be implemented to deform the conductive filament, at least in part, causing the memory cell to return to the high resistive state from the low resistive state(s), as mentioned previously. This change of state, in the context of memory, can be associated with respective states of a binary bit or multiple binary bits. For an array of multiple memory cells, a word(s), byte(s), page(s), etc., of memory cells can be programmed or erased to represent zeroes or ones of binary information, and by retaining those states over time in effect storing the binary information. In various embodiments, multi-level information (e.g., multiple bits) may be stored in respective memory cells.

General Overview

Today, many non-volatile memory markets are dominated by NAND Flash memory, hereinafter referred to as flash memory. Flash memory (e.g., three-terminal memory) has many characteristics that are different from certain two-terminal memory detailed herein. One potential result of differing characteristics is that memory management techniques, such as logical-to-physical (L2P) and wear leveling (WL), can differ as well between flash memory and two-terminal memory. While parts of this disclosure focus on L2P translation, it is understood that techniques detailed herein can also apply to physical-to-logical translation as well.

One notable differing characteristic between flash memory and two-terminal memory relates to in-place overwrite of data, which is supported by some types of two-terminal memory, but not supported by flash memory. Due to disturb errors or other issues, a block of flash memory generally must be erased first before writing data to any page of memory in that block. Additionally, wear leveling algorithms employed for flash memory typically add additional write operations as data is moved from high-use blocks to low-use blocks. Such measures can result in a write amplification (WA) factor of 3×. At a write amplification of 3×, each high level write instruction generally requires three low-level operations (e.g., a move operation, an erase operation, and a write operation) resulting generally in three times the wear on the memory. Such can dramatically affect memory endurance.

Since flash memory has dominated the marketplace, traditional memory management techniques, including L2P translation and WL, have been designed based on the characteristics of flash memory. For example, a consequence of a 3× WA has lead to a large over-provisioning (OP) in order to mitigate the 3× WA. Large OP causes capacity reduction since a significant portion of the total memory is allocated to OP instead of representing usable memory.

One significant use of L2P translation is to provide wear leveling as well as other memory management elements. Wear leveling typically seeks to more evenly spread wear (e.g., a number of memory operations such as writing or erasing) among the usable memory. Because flash memory does not support overwrites, etc., conventional memory management schemes must support not only static wear leveling (SWL), but also dynamic wear leveling (DWL). Traditional schemes can suffer from substantial performance degradation due to DWL. Such can be caused by garbage collection procedures, a so-called 'write cliff', or other inconsistent performance issues.

Moreover, traditional flash memory management techniques generally require a large system footprint for FTL management. For example, a large amount of memory is needed for maintaining FTL tables. As one example, the FTL table can require an entry for each 4 kB of data. Previous techniques can further require very complex design to maintain the tables during power failure or, additionally or alternatively rely on super capacitors, battery backup, or NVDIMM.

In contrast, certain types of two-terminal memory can provide beneficial characteristics that can be leveraged to reduce the demands of memory management such as the demands caused by L2P translation, wear leveling, table maintenance during power failure, and so on. For example, certain types of two-terminal memory can have an endurance (e.g., an average number of write cycles before failure) of 100K or more. Such memory can also support overwrite capabilities, so erase operations are not required. Such memory can further support very low read latency (e.g., about one microsecond or less) and low write time (e.g., about two microseconds or less).

Certain two-terminal memory (TTM), such as filamentary-based, resistive-switching memory, represents an innovative class of non-volatile storage. In some embodiments, such has many beneficial attributes compared to flash memory, which currently dominates many memory markets. In some embodiments, TTM can provide very fast read and write times, small page sizes, in-place writes, and high endurance. Even though the endurance of TTM is high compared to flash memory, the endurance is not so remarkably high that in practical use benefits cannot be obtained by using some form of wear leveling. Further, storage system that use TTM can benefit from other memory management features like data integrity across power cycles, detecting, anticipating, and/or managing various memory failures, and so forth.

This disclosure proposes a set of techniques to manage TTM storage systems. In some embodiments, largely due to certain advantages of TTM over other types of memory, the management layer can be very thin both in terms of computational and memory resources, while still effectively providing various benefits normally associated with much larger management layers such as, e.g., L2P translation, wear leveling, power failure recovery, and so on.

Since TTM supports in-place overwrite of data, DWL and garbage collection are not required. Such by itself represents a significant reduction that can be realized for memory management overhead. However, TTM can still benefit from efficient SWL, e.g., to ensure wear is spread across the available memory so that some parts of memory do not wear more quickly than others or the like. As with many other elements of memory management, implementation of SWL relies on L2P translation.

L2P Translation Overview

In order to realize efficient L2P translation and to other related ends, consecutive logical blocks (LB) of memory can be grouped into a logical group (LG). Logical groups can be of substantially any size and that size is not necessarily dependent on a physical layout of a device. A LB can be mapped to a physical block (PB) that represents one or more pages of a physical memory location in the TTM. As used herein a block, e.g., a LB or PB, can represent an addressable unit of data such as a page of memory or a collection of pages. In one embodiment, LB and PB represent same unit of data. A group of PBs can be grouped together form a physical group (PG) that corresponds to an associated LG. There need not be any restriction on how the PG is defined. For example, PBs of a given PG can be in a single bank of memory, on a single chip of memory, can span multiple chips of memory, or even span multiple channels (e.g., to enable parallelism elements). In some embodiments, PBs of a PG corresponds to the way data of logical pages is stripped across the physical pages.

Generally, a group size (e.g., a number of blocks in a group) can be configurable, but typically is the same for physical groups and logical groups. Typically, each LG is mapped to a corresponding PG. An L2P translation table can be employed to map a given LG to a corresponding PG. The L2P table can be kept in volatile memory for fast access. Moreover, this L2P table can have significantly fewer entries than previous translation tables such as those associated with flash memory. In other words, the L2P table can have one entry per group of blocks instead of one or more entries per page of flash memory, which can reduce the size of the L2P table over other systems as substantially a function of group size. Due to a smaller size, the L2P table can be kept in volatile memory inside the controller, whereas in embodiments using flash memory, an external memory component such as DRAM is typically required to accompany the controller which increases the cost of the system and its power consumption and reduces the performance. The L2P table can further be stored in TTM (e.g., non-volatile) to enable recovery, such as after a power failure or interruption. In some embodiments, the L2P can be kept on a non-volatile memory embedded in the controller.

In some embodiments, the group size of LGs and PGs can be static and the same across the entire storage system. In some embodiments, the storage system can be divided into multiple data partitions and the group size of LGs and PGs can be static but differ between different partitions. For example, a first partition of the available non-volatile memory can have one static group size whereas a second partition can have a different static group size. In some embodiments, the first partition and the second partition can have dynamic group sizes that can be same or different and can be determined and/or updated in situ and/or in operation based on traffic patterns or other suitable parameters.

Static Wear Leveling Overview

In the course of normal TTM operations without SWL, L2P mapping is not changed and all updates to memory can be in-place overwrites. This may result in some PGs that experience much higher wear compared to other PGs. Thus, to even out the wear across the PGs, SWL can be implemented.

However, in some embodiments, SWL can be overhead both in terms of performance and in terms of wear. For example, SWL procedures can operate to swap data between portions of the memory that are highly active with portions of the memory that are not highly active. Swapping of data itself causes wear as well as increasing demand resources. Hence, it can be advantageous to minimize or reduce SWL procedures, for instance, trigger SWL procedures very infrequently and/or only if required.

SWL can be implemented by comparing write counters to a SWL table of various thresholds. In some embodiments, the write counters can be 4-byte counters that are incremented when any portion (e.g., a block or a page) of a PG is written to in order to keep track of wear for a PG. In other words, each time a block or a page of a PG is written, the corresponding write counter is incremented by one. A separate write counter can be employed for each PG of the usable TTM (e.g., data partition(s)). Write counters can be stored in volatile memory during normal operations and can be backed up in a metadata partition of the TTM (e.g., non-data partition(s)). In some embodiments, the write counters can be stored in a non-volatile memory.

Write counter data can include the write counters and a tier index that can keep track of a number of times a corresponding PG has underwent a WL procedure. For example, when a write counter of a PG surpasses a high count threshold and is swapped with a low count PG, then the tier index of both PGs can be incremented to indicate these PG's are in a next higher tier. As will be explained below, such can prevent additional WL procedures from triggering unnecessarily.

The SWL table can maintain various WL tiers, and a high threshold value and low threshold value for each WL tier. In some embodiments, a fixed number of constant high and low thresholds can be established configuration during or after manufacture. Generally, SWL thresholds need not be placed at uniform intervals. Moreover, normal traffic may even out the wear in between these threshold intervals to, e.g., reduce the triggering of SWL procedures. As with write count data, a distinct instance of an SWL table can be maintained per PG, e.g., in order to track the SWL states for each PG.

As noted any write (e.g., overwrite) to a portion of memory allocated to a particular PG can increase a write count corresponding to the PG. High and low threshold and tier indices can be employed to trigger and manage write distribution and thereby effectuate the static wear leveling. For example, when a write operation causes an associated write counter of a source PG to exceed the high threshold (e.g., maintained in the SWL table) for the indicated tier, then the SWL procedure(s) can be triggered.

A target PG with a write count that is lower than the low threshold for the tier is identified and data of the target PG is swapped with the data of the source PG. The tier indices for both PGs are increased to record completion of one write distribution cycle. The L2P table can be updated accordingly. As noted, thresholds do not need to be linear. Rather, the thresholds can be set such that the negative effects of triggering the SWL procedure (e.g., performance, wear, etc.) can be reduced and in some cases substantially negligible. In some embodiments, thresholds can be set or updated in situ and/or in operation. In some embodiments, the thresholds can be determined at run time based on traffic patterns witnessed at the TTM or other parameters. In some embodiments, a small part (e.g., about one PG in size) of the TTM (e.g., a non-data partition) can be reserved and used as temporary storage to facilitate the data swap between the source PG and the target PG.

Example L2P Translation Systems

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Referring initially to FIG. 1, memory device 100 is depicted that provides for a thin and efficient logical-to-physical (L2P) mapping. For example, memory device 100 can comprise controller 102. Controller 102 can be operatively coupled to first memory 104. First memory 104 can comprise an array of non-volatile two-terminal memory cells. In some embodiments, all or a portion of first memory 104 can be physically located within memory device 100. In some embodiments, all or a portion of first memory 104 can be remote from memory device 100. Controller 102 can comprise L2P mapping function 106 that can facilitate translating a logical memory address 108 to a physical memory address 110. Logical memory address 108 can be characterized as a logical address of data of a logical data space. Physical memory address 110 can be characterized as an address corresponding to physical memory 122 of first memory 104.

Controller 102 can further be operatively coupled to second memory 112. Second memory 112 can comprise volatile or non-volatile memory. For example, second memory 112 can have static random access memory (SRAM)-like characteristics, or can be implemented as a combination of SRAM and dynamic random access memory (DRAM) that are volatile or magnetoresistive random access memory (MRAM) that is very fast and non-volatile. In some embodiments, second memory 112 can be implemented as resistive random access memory (RRAM) and particularly one-transistor-one-resistor (1T1R) RRAM which are very fast. A 1T1R RRAM implementation can be advantages as, in some embodiments of the disclosed subject matter, updates do not happen as often and as such, endurance of about 100K and using range program time should be sufficient in this application. A one-transistor-many-resistor (1TnR) RRAM typically has a longer read access time, which could cause performance issues. In the case of 1T1R, the memory can be monolithically integrated into the controller as well.

In some embodiments, all or a portion of second memory 112 can be included in memory device 100 and/or controller 102. The volatile memory of second memory 112 can store L2P table 114. L2P table 114 can comprise a first set of physical group identifiers (PGIs), which can be referenced herein, either individually or collectively, as PGI(s) 118. A given PGI 118 can identify a corresponding physical group (PG) 124 of first memory 104, which can comprise substantially any positive integer, M, of PGs 124. Various pages in a given PG 124 can be grouped together in the PG 124 according to a defined striping profile 120.

L2P table 114 can further comprise a second set of logical group identifiers (LGIs), which can be referenced herein, either individually or collectively, as LGI(s) 116. A given LGI 116 can identify a logical group (LG), having M consecutive logical pages of data, that maps to a corresponding PG 124. Additional detail regarding logical and physical memory spaces can be found with reference to FIGS. 2A and 2B. Additional detail regarding striping profile 120 can be found in connection with FIG. 3.

Figure 2A:
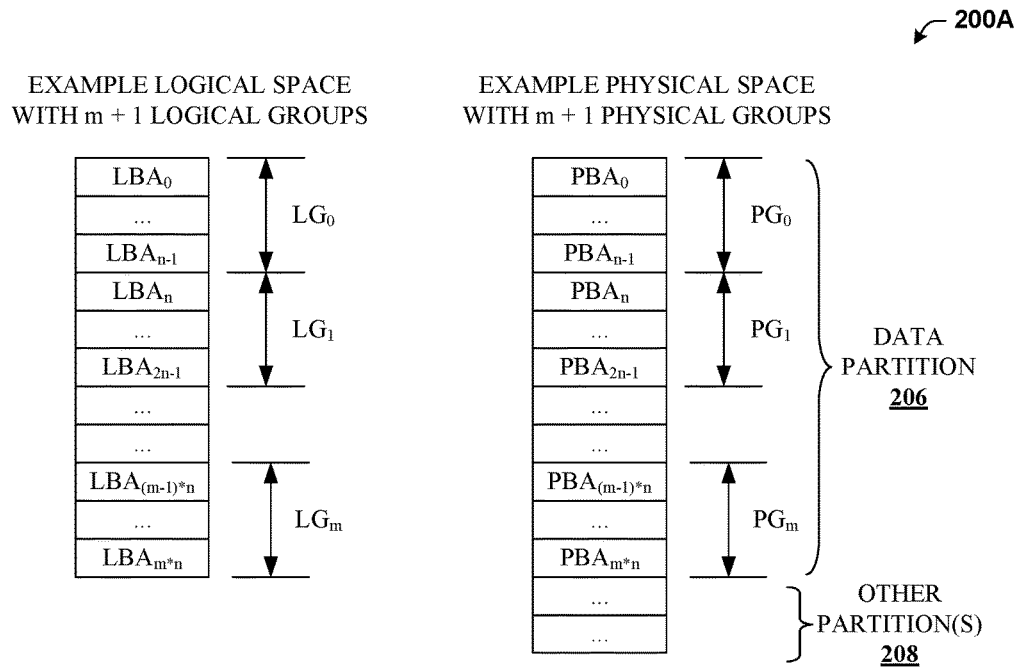
FIG. 2A illustrates an example block diagram illustrating various examples relating to logical and physical spaces in connection with L2P mapping in accordance with certain embodiments of this disclosure.

While still referring to FIG. 1, but turning now to FIG. 2A, block diagram 200A is presented. Block diagram 200A provides various examples relating to logical and physical spaces in connection with L2P mapping.

For purposes of reducing metadata and related overhead, in some embodiments, sequential logical block addresses (LBAs) can be combined together to form a logical group (LG). These sequential LBAs can be mapped to sequential physical page addresses (PPAs) and/or sequential physical block addresses (PBAs) locations in physical memory. These consecutive PPAs or PBAs in memory can form a physical group (PG). A PG 124 can be made up of consecutive PBAs and/or PPAs within a same chip or same bank or can be made up of locations across all the chips in a channel or can be made up of multiple chips across multiple channels, which is further detailed in connection with FIG. 3. In any case, the layout can be predefined and known such that only knowing the starting PBA or PPA of PG 124 is enough to find the location of any LBA mapped to the PG.

In this example, $LG_0$ can map to $PG_0$, $LG_1$ can map to $PG_1$, and so on. The collection of $LG_0$ through $LG_m$ can represent substantially of logical memory that can be mapped to $PG_0$ through $PG_m$, which can represent substantially all usable physical memory of first memory 104. This usable physical memory can be referred to as data partition 206. In some embodiments, first memory 104 can include other partitions 208, which is further detailed in connection with FIG. 5.

Figure 2B:
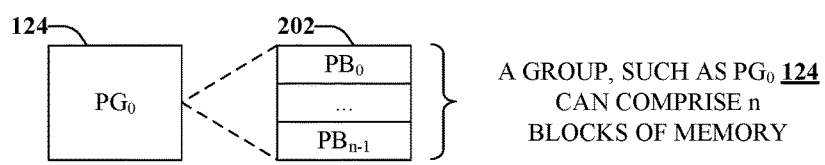
FIG. 2B illustrates an example block diagram illustrating example hierarchical views of a PG and a physical block in accordance with certain embodiments of this disclosure.
Figure 2B:
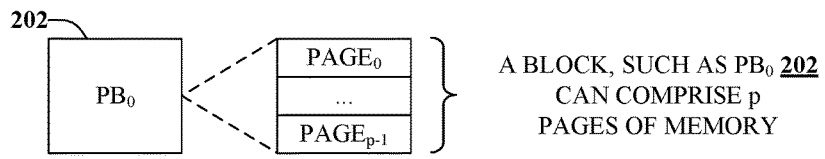

Referring now to FIG. 2B, block diagram 200B is presented. Block diagram 200B provides example hierarchical views of a PG and a physical block. As detailed, a PG (e.g., $PG_0$ 124) can comprise substantially any positive integer, n, physical blocks 202 of physical memory. A given physical block (e.g., $PB_0$ 202) can be addressed by a physical block address (e.g., $PBA_0$). In some embodiments, a PB 202 can represent about 4 kB of information. In some embodiments, PB 202 can represent about 512 bytes of information. However, since TTM can support small pages a given PB 202 can comprise substantially any positive integer, p, pages of memory. Although not depicted here, in some embodiments, a page can be larger than a block, in which case a page can comprise multiple blocks. For example, in some embodiments, the size of the block can correspond to a defined data size utilized by a host. Given that TTM can support substantially any suitable page size, in some cases it may be advantageous to have page sizes larger than the block size.

As an assumption, if the number of LBAs in LG (and, likewise, the number of PBAs or PPAs in a PG) is small enough, it can be assumed, in some embodiments, that wear within a PG 124 is mostly uniform. In other words, that all the PBAs within a PG 124 will experience approximately the same wear, and thus SWL at a granularity of a given group size is sufficient to efficiently utilized a TTM storage system.

From observation, this assumption is valid for certain workload types, namely, types such as mostly sequential workloads, mostly random workload across the whole storage capacity, mostly random workload across subset of storage capacity and many other workloads when number of PBAs in a PG 124 is less than about 256 4K LBAs. Hence, in some embodiments, a PG 124 can represent about one megabyte of data or less and can have fewer than or equal to 256 physical blocks (e.g., n≤256) of 4K block size.

Figure 3:
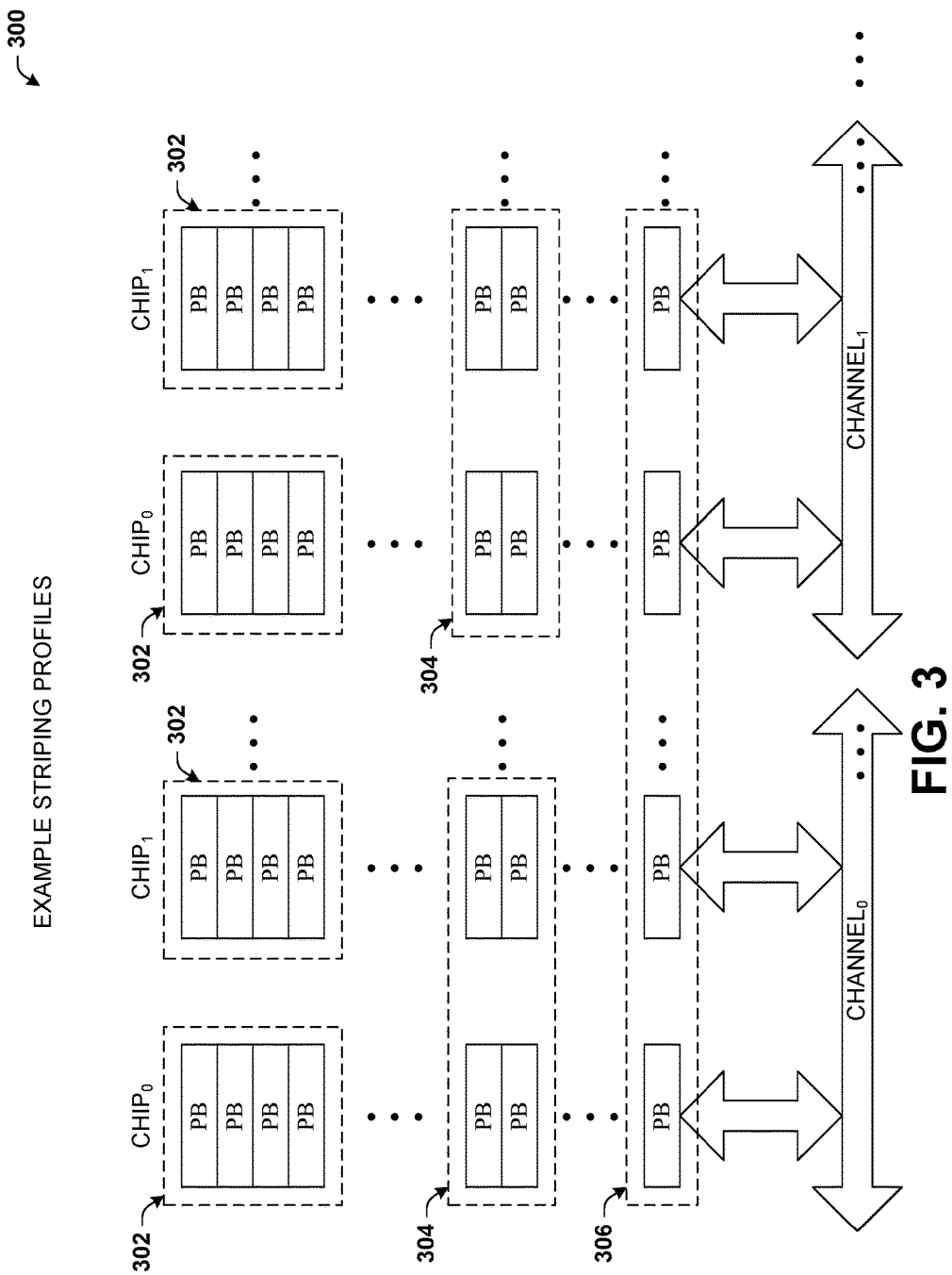
FIG. 3 depicts an example block diagram that illustrates various example striping profiles in accordance with certain embodiments of this disclosure.

While still referring to FIG. 1, but turning now as well to FIG. 3, block diagram 300 is presented. Block diagram 300 provides various example striping profiles. For example, reference numeral 302 depicts an example striping profile 120 in which all PBs of a PG are assigned to a single chip of memory, potentially on a single memory bank and potentially sequential. Reference numeral 304 depicts an example striping profile 120 in which a first portion of PBs are from a first chip (e.g., $CHIP_0$) and a second portion of the PBs are from a second chip (e.g., $CHIP_1$). In this example, both the first and second chips are accessed via the same channel (e.g., $CHANNEL_0$ or $CHANNEL_1$, etc.). Reference numeral 306 depicts an example striping profile 120 in which a single PG 124 spans multiple chips and multiple channels.

In contrast to other embodiments in which a page is the same size as a block or there multiple blocks per page, in cases where there are multiple pages per block (as illustrated in FIG. 2B), stripping can stripe data across the pages of different memory devices that can belong to different PGs. Such can represent another example stripping profile.

Continuing the discussion of FIG. 1, as noted, controller 102 can utilize L2P table 114 to map logical memory address 108 (e.g., an LBA) to physical memory address 110 (e.g., a PBA). It is understood that one or more copies of L2P table 114 (denoted as L2P table copy 128) can be stored in a non-volatile manner in first memory 104. Such can enable L2P table 114 to be restored in second memory 112 in the event of power failure or the like.

As also noted, knowing the starting PBA of a PG 124 is enough to find the location of any LBA mapped to the PG 124 based on a known striping profile 120 and vice versa. Such can be achieved according to the following. Upon receipt of a given LBA (e.g., logical memory address 108), a given LG can be identified by dividing the LBA by the number of LBAs per LG (e.g., n). Having determined the correct LG (identified by LGI 116), the corresponding PG can be readily identified based on striping profile 120 and other known data contained in L2P table. Having determined the correct PG 124 (e.g., identified by PGI 118), what remains is to determine offset 126 within the identified PG 124. Such can be accomplished by way of a modulo operation, e.g., a remainder of LBA divided by the number of LBAs per LG. For example, offset 126 can be LBA % n.

Figure 4:
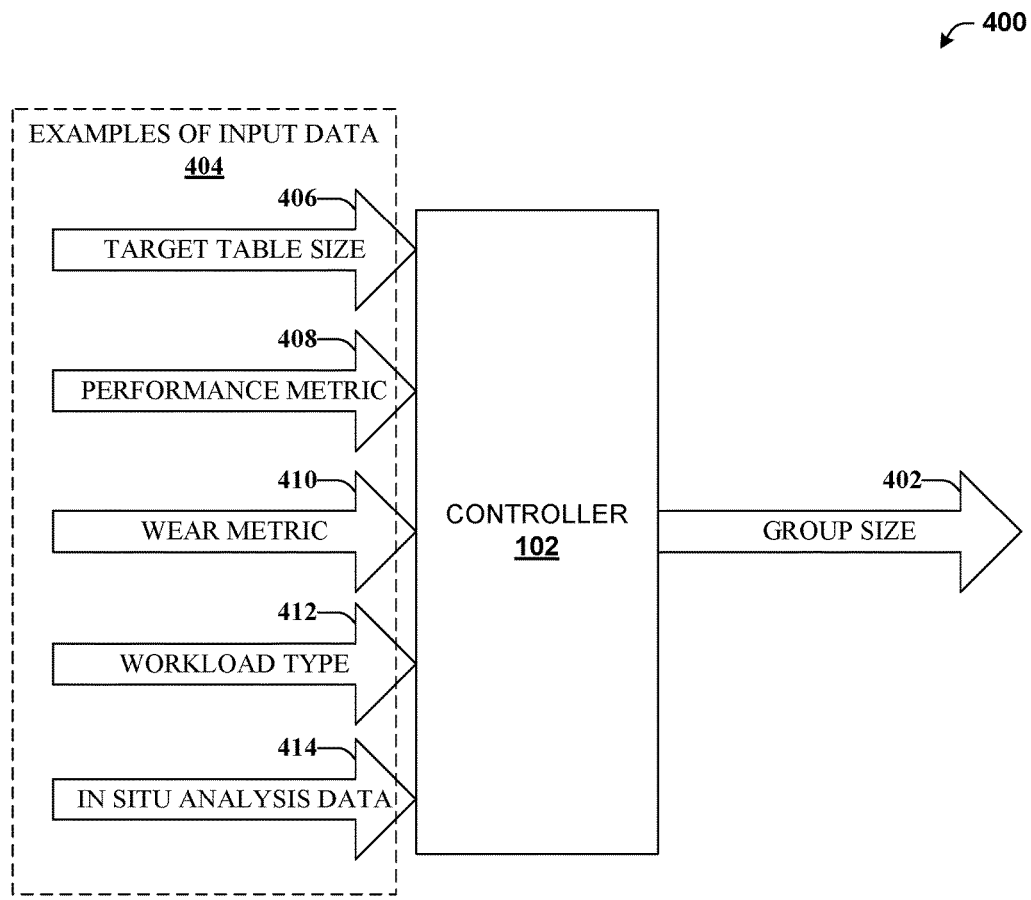
FIG. 4 depicts an example system illustrating various examples relating to a configurable group size in connection with L2P translation in accordance with certain embodiments of this disclosure.

Referring now to FIG. 4, system 400 is illustrated. System 400 depicts various examples relating to a configurable group size in connection with L2P translation. As previously discussed, group size 402 can be configurable. Group size 402 is used herein as a number of blocks (e.g., n) that are grouped together in the same LG or PG 124. Other metrics relating to size might also be used. In some embodiments, group size 402 can be determined and/or updated by controller 102 based on input data 404.

In some embodiments, input data 404 can represent a determined value that is determined to result in a target table size. Such is labeled here as reference numeral 406. It can be readily appreciated that a table size of L2P table 114 is a function of the number of groups. Grouping fewer blocks into a group can result in more groups (e.g., smaller group size 402 and larger table size), whereas grouping more blocks per group can result in fewer groups (e.g., larger group size 402 and smaller table size). In general, a smaller table size can be preferred as such can reduce overhead and/or satisfy various performance metrics 408. However, in order to reduce table size, group size 402 must increase. Generally, it is not desirable to increase group size 402 beyond the point in which wear (within a group) is not reasonably uniform as indicated by wear metric 410. Hence, target table size 406 can relate to data indicating an optimal or target table size that balances these competing influences (e.g., performance metric 408 vs. wear metric 410).

In some embodiments, input data 404 can represent a defined workload type 412. The defined workload type 412 can be a substantially sequential workload, a substantially random workload across substantially all PGs of the first memory, a substantially random workload across a subset of PGs of the first memory, or another suitable workload type 412. Group size 402 can be determined based on an expected workload type 412 e.g., to optimize or improve efficacy for the identified type.

In some embodiments, controller 102 can determine or update group size 402 in situ. For example, input data 404 can represent in situ analysis data 414 that can be collected by observing first memory 104 in operation. For instance, controller 102 can, based on in situ analysis data 414, determine that first memory 104 is operating according to a particular workload type 412 and then update group size 402 accordingly.

Figure 5:
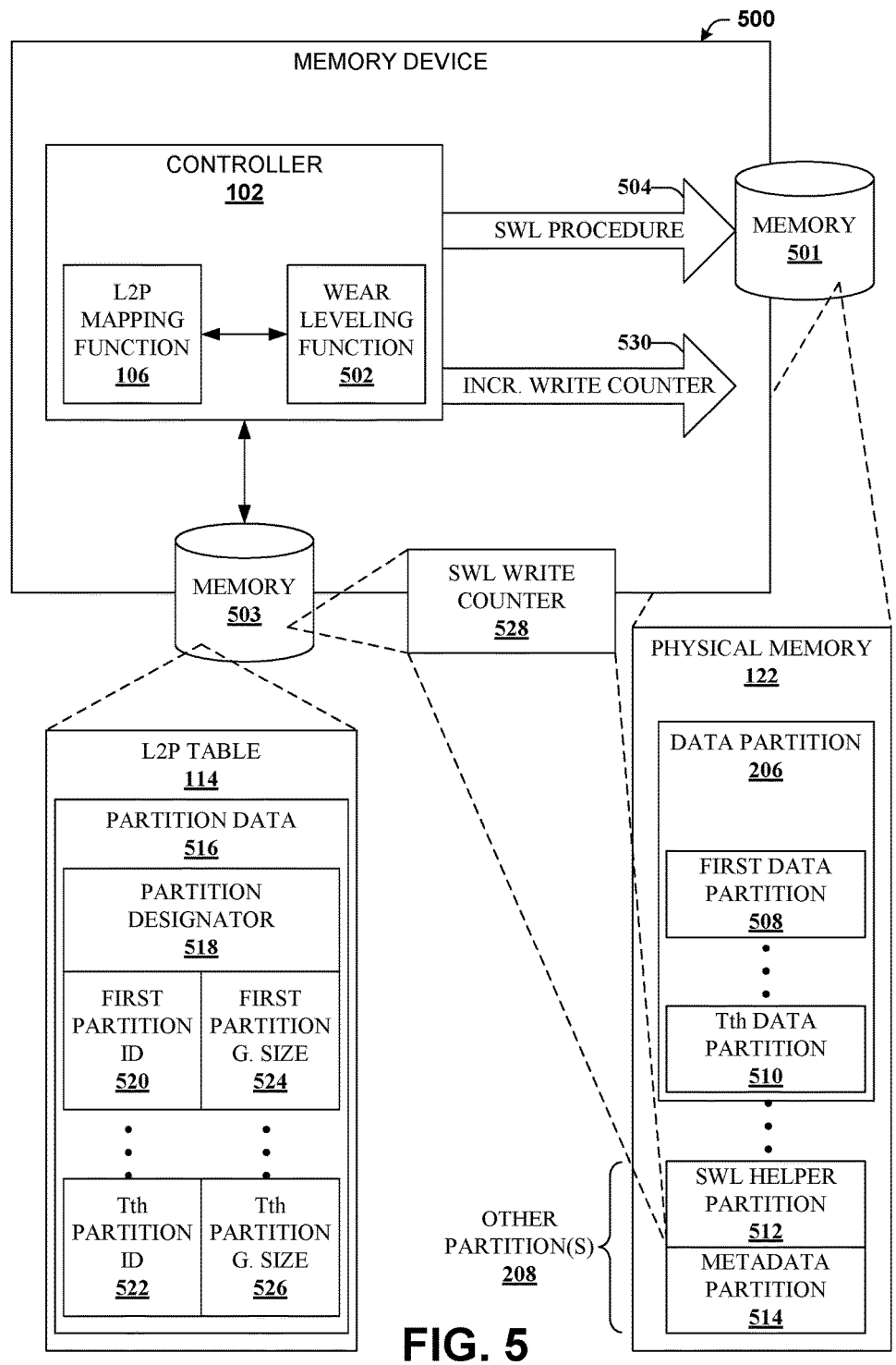
FIG. 5 illustrates an example memory device that provides for additional aspects or elements in connection with thin and efficient logical-to-physical (L2P) mapping in accordance with certain embodiments of this disclosure.

Turning now to FIG. 5, memory device 500 is illustrated. Memory device 500 can provide for additional aspects or elements in connection with thin and efficient logical-to-physical (L2P) mapping. For example, memory device 500 and/or controller 102 can employ L2P mapping function 106 to provide wear leveling function 502. As a result of wear leveling function 502, a static wear leveling procedure 504 can be performed on memory 501, which can be non-volatile, TTM such as that described in connection with first memory 104 of FIG. 1.

As previously detailed, because memory 501 can comprise TTM, which allows overwrite operations, DWL, garbage collection, and certain other memory management operations are not needed. However, memory 501 can still benefit from static wear leveling, which can be referred to herein with reference to SWL procedure 504. SWL procedure 504 can operate to more evenly spread memory wear among the physical memory 122 (of first memory 104 and/or memory 501), which can improve memory endurance not only for data partition 206, but also for other partitions 208.

In some embodiments, data partition 206 can represent a single logical partition comprising all or substantially all usable memory (e.g., what is available to high-level applications for storage). Other partitions 208 can exist as well, with the potential caveat that memory allocated to these other partitions 208 reduces overall capacity of data partition 206.

Data partition 206 is typically the largest partition. Data partition 206 can comprise all PGs 124. Hence, if there are M LGs allocated for memory device 500 based on exposed capacity of the storage medium and no data reduction is employed, then there are M PGs 124 in data partition 206. Data partition 206 can be organize and managed in terms of PGs 124. Because PGs 124 can be relatively large in size, management operations (e.g., L2P translation, wear-leveling, etc.) can be thin and efficient. Among other partitions 208, physical memory 122 can include an SWL helper partition 512, a metadata partition 514, or other suitable partitions.

In some embodiments, SWL helper partition 512 can be used as a temporary placeholder while moving data during SWL procedure 504. SWL helper partition 512 can represent a relatively small partition in terms of size. The size of SWL helper partition 512 can be configurable and can be based on a number of parallel SWL operations to be supported by memory device 500 as well as other factors affecting wear. SWL helper partition 512 can be organized and managed in term of PGs 124. In some embodiments, metadata partition 514 can store metadata that is used for memory management operations such as SWL procedure 504. Metadata partition 514 can be relatively small and can be organized and managed in terms of TTM pages, which, as noted previously, can be smaller in size than conventional flash memory pages.

While data partition 206 has been described as a single logical partition, in some embodiments, data partition 206 can be logically divided into substantially any positive integer, T, partitions, which are exemplified by first data partition 508 and Tth data partition 510. Partitioning data partition 206 into multiple logical partitions (e.g., first data partition 508 through Tth data partition 510) can provide certain advantage, some of which are noted below. In those cases in which data partition 206 is further partitioned, L2P table 114 can comprise partition data 516.

Partition data 516 can comprise partition designator 518 that can indicate that data partition 206 is logically divided into multiple data partitions. In some embodiments, partition designator 518 can indicate the number (e.g., T) of logical partitions data partition 206 includes. In some embodiments, partition data 516 can comprise first partition identifier 520 and Tth partition identifier 522 that can identify a specific partition. As one example, a given PGI 118 that identifies a corresponding PG 124 can include a partition identifier (e.g., 520, 522) to indicate to which logical partition the PG 124 belongs.

In some embodiments, group size 402 can differ for different logical partitions. For example, suppose data partition 206 is divided into two logical partitions, 508 and 510. While a first group size can be uniform for all PGs 124 in partition 508, such can differ from a second group size that reflects group size 402 of partition 510. Hence, partition data 516 can comprise first partition group size data 524 that indicates a group size 402 of first data partition 508 and Tth partition group size data 526 that indicates a group size 402 of Tth partition 510. Group size data (e.g., 524, 526) can be the same or different and can be determined or updated independently. Moreover, such can be beneficial in that various logical partitions can be potentially optimized for the types of workloads that are individually witnessed in operation similar to what was described in connection with FIG. 4.

In some embodiments, memory 503, which can be substantially similar to second memory 112, can comprise SWL write counter 528. In some embodiments, a respective SWL write counter 528 can exist for each PG 124. In other words, if data partition 206 comprises M PGs 124, then M SWL write counters 528 can exist. SWL write counter 528 can represent a running tally of a number of times a corresponding PG 124 has been programmed (e.g., write operation, overwrite operation, or otherwise changes state). Hence, controller 102 can increment SWL write counter 528, which is represented by reference numeral 530. Incrementing 530 can be in response to a corresponding PG 124 being programmed. Since PG 124 represents a group of physical blocks and, in some cases, each physical block can comprise multiple pages, SWL write counter 528 can incremented in response to any page or any physical block being programmed, or even any bit or byte within a page being programmed to a different state.

SWL write counter 528 can be included in L2P table 114 or can be maintained in other portions of memory 503. One or more backup or copy of SWL write counter(s) 528 can also exist memory 501, such as in metadata partition 514.

Example Wear Leveling

Still referring to FIG. 5, in the context of wear leveling, memory device 500 can comprise memory 503 (e.g., volatile memory). Memory 503 can store L2P table 114 that maps an LGI to a PGI. The PGI can identify a PG among PGs of memory 501 (e.g., non-volatile TTM). The PGs can respectively comprise multiple PBAs that address respective blocks of memory.

As previously indicated, memory device 500 can comprise controller 102 that can be coupled to memory 501 and memory 503. Controller 102 can facilitate performance of operations that provide SWL procedure 504. SWL procedure 504 can comprise determining that a block of data has been written to a PBA of the multiple PB As. The write can represent substantially any amount of data such as a page of data, multiple pages of data, or the like. SWL procedure 504 can further comprise determining the PG (e.g., PG 124) that comprises the PBA. SWL procedure 504 can further comprise updating write counter data, which is further detailed in connection with FIG. 6A.

Figures 6A, 6B:
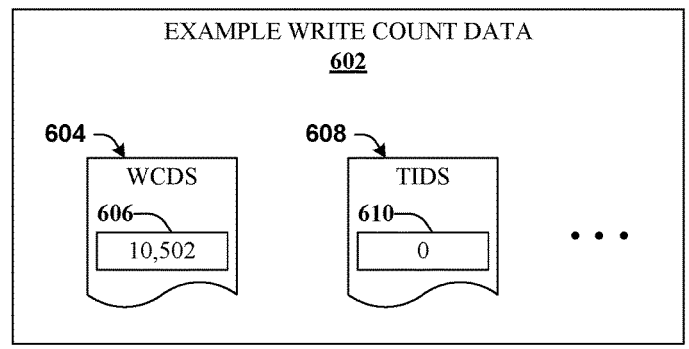
FIG. 6A illustrates an example block diagram that provides an example of write counter data in accordance with certain embodiments of this disclosure.
FIG. 6B illustrates an block diagram that provides an example of the static wear leveling (SWL) table in accordance with certain embodiments of this disclosure.

While still referring to FIG. 5, but turning now as well to FIG. 6A, block diagram 600A is presented. Block diagram 600A provides an example of write counter data 602. In some embodiments, write data 602 can comprise a write counter data structure (WCDS) 604. WCDS 604 can store a value representative of a count of writes and/or the aforementioned write count, which is represented herein as write count value 606. In this example, write count 606 is 10,502, which can indicate that memory addresses such as PBAs or PPAs that are included in a corresponding PG have witnessed 10,502 writes thus far.

In some embodiments, write count data 602 can comprise a tier index data structure (TIDS) 608. TIDS 608 can represent and/or store a wear leveling tier value 610 associated with write count 606. In some embodiments, tier value 610 can represent a number of times data of a corresponding PG 124 has been swapped and/or a number of times the corresponding PG 124 has been subject to a static wear leveling procedure even if the associated data is not swapped (e.g., because low count threshold is not satisfied). In this example, the wear leveling tier value 610 is "0", which is further explained below in connection with FIG. 6B. However, still referring to FIG. 5, recall that SWL procedure 504 can include updating write counter data 602. In more detail, write counter data 602 can be updated by incrementing a write count value 606 that is stored in WCDS 604. Other WL systems such as those for flash memory typically increment a counter in response to an erase operation. In contrast, WL procedure 504 updates in response to write operations.

It is understood that once write count value 606 reaches a target threshold, SWL procedure 504 can determine if a swap procedure is to be processed. Such can be determined, at least in part, based on a comparison with data stored in a SWL table, an example of which can be found with reference to FIG. 6B.

Turning now to FIG. 6B, block diagram 600B is presented. Block diagram 600B provides an example of SWL table 612. SWL table 612 can comprise various data structures such as WL tier 614. In some embodiments, WL tier 614 can be substantially similar to tier value 610 in that such can represent a wear leveling tier. SWL table 612 can further include a high threshold value 616 and a low threshold value 618 for each WL tier 614.

In some embodiments, high threshold value 616 can be the product of a high value (for a given WL tier 614) multiplied by group size 402 (e.g., a number of PBAs or pages in a PG, in this case 256 4K blocks or pages). In this example, the high value for tier 0 is 40,000, the high value is 60,000 for tier 1, and so on. It is understood that because a group size 402 can be selected such that wear can be reasonably uniform within a PG based on the type of load, it can be assumed that on average every 256 (or other group size 402) writes to a given PG will equate to about one write per PBA. Hence, when high threshold value 616 (e.g., 40,000*256) for tier zero is reached, then it is assumed that each PBA within the PG will have been written 40,000 times. In embodiments in which a PB comprises one or more pages, write count value 606 can be incremented when a page is written to, and it can be assumed that wear among the pages within a physical block is relatively evenly distributed depending on the work load type.

As noted previously, when any PBA or any page of a PG is written, an associated write count value 606 (e.g., of write count data 602 associated with that PG) can be incremented. When write count value 606 is compared to SWL table 612 and determined to exceed high threshold value 616 for the associated tier (e.g., tier value 610=WL tier 614), then a tier incrementing procedure can be triggered. For example, when write count 606 exceeds (40,000*256) then the tier incrementing procedure can be triggered. For example, the tier incrementing procedure can increment the tier value 610 from "0" to "1". Because tier value 610 is now set to "1", subsequent writes to the associated PG can be compared to a different high threshold value 616 in SWL table 612. For instance to a higher value equal to (60,000*256) rather than the tier 0 high value of (40,000*256).

In some embodiments, exceeding high threshold value 616 can also trigger a data swap procedure, but such can be subject to satisfying a different value contained in SWL table 612, namely a low threshold value 618. For example, when a write count value 610 of a source PG (of tier 1) exceeds the high threshold value 616 (of tier 1), then controller 102 can identify a target PG with a lowest write count value 606 that is in the same or lower tier (e.g., "0" or "1") as the source PG. If the write count 606 of the target PG is not less than the associated low threshold value 618, then the data is not swapped but the tier value 610 of the source PG can be incremented. One reason data is not swapped can be for the sake of efficiency. For instance, if the write count 606 of the target PG is above the low threshold value 618 and therefore within a defined count of the high threshold value 616, then it can be determined that the benefits of swapping data in that case is outweighed by the cost of swapping.

On the other hand, if the write count 606 of the target PG is below the low threshold value 618, then it can be determined that the benefits of swapping data in that case is not outweighed by the cost of swapping, so data can be swapped between the target PG and the source PG. An example swapping procedure is detailed in connection with FIG. 7.

Figure 7:
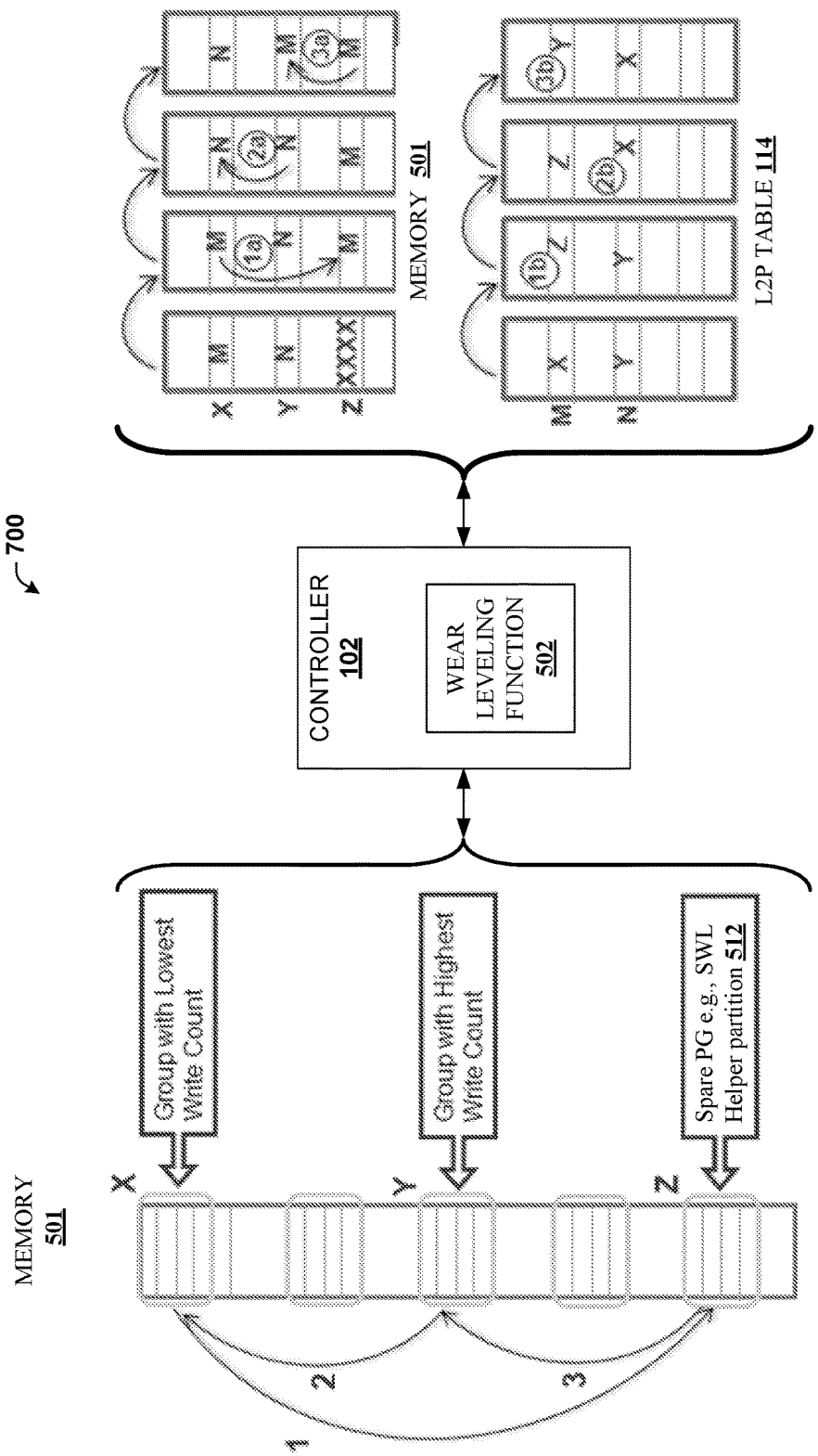
FIG. 7 illustrates an example block diagram that depicts an example swapping procedure that can be facilitated by a controller in connection with WL function in accordance with certain embodiments of this disclosure.

Turning now to FIG. 7, block diagram 700 is illustrated. Block diagram 700 depicts an example swapping procedure that can be facilitated by controller 102 in connection with WL function 502. As detailed above, controller 102 can identify a source PG, e.g., when a write count 606 of the source PG exceeds a high threshold value 616 of SWL table 612. In this example, this source PG is identified as PG "Y" of memory 501 (e.g., non-volatile TTM). PG "X" is also identified by controller 102 as the target PG (of a same or lower tier) with a lowest write count 606. Provided the write count 606 of X is less than low threshold value 618, then data swapping can ensue between X and Y. Diagram 700 also illustrates spare PG denoted as "Z", which can temporarily hold the data from one of X or Y. In this example, Z temporarily stores the data from X, but data from Y could be stored in other embodiments. In some embodiments, Z can be a non-data partition of memory 501, such as other partitions 208. In some embodiments, Z can be included in SWL helper partition 512. In some embodiments, Z can be included in memory 503 (e.g., volatile memory). As illustrated on the left side of FIG. 7, at step 1, data of X is copied to Z. At step 2, data of Y is copied to X. At step 3, data of Z, which was previously copied from X, is copied to Y. In some embodiments, step 3 is not performed, and changes to L2P table 114 detailed below can be adjusted accordingly.

On the right side of FIG. 7, more detail is given with respect to updating both memory 501 and L2P table 114. With regard to memory 501, in the initial state, X stores data M, Y stores data N, and Z does not store any pertinent data. With regard to L2P table 114, data M is pointed to by a PGI that identifies X, data N is pointed to by a PGI that identifies Y. At step 1*a*, data M is copied to Z. At step 1*b*, L2P table 114 is updated to reflect that data M is pointed to by a PGI that identifies Z. At step 2*a*, data N is copied to X. At step 2*b*, L2P table 114 is updated to reflect that data N is pointed to by a PGI that identifies X. At step 3*a*, data M is copied to Y. At step 3*b*, L2P table 114 is updated to reflect that data M is pointed to by a PGI that identifies Y.

It is understood that in certain higher performance systems, pipelining techniques can be used. Hence, many different commands can be in the pipeline at a given time. Hence, it can be advantageous to synchronize data swaps and L2P table updates in accordance with various pipelining techniques.

For example, in normal operation, a FIFO host command queue can receive commands from a host. Controller 102 can lookup PG(s) corresponding to the LG(s) in the L2P table. It is noted that a single host command may correspond to one or more LGs. Controller 102 can split the host command into one or more sub-commands, using the PG, and place the sub-commands in a physical command (PCMD) queue. Commands from the PCMD queue can be dispatched to different portions of devices of memory 501 based on sub-command physical address. Once a high threshold value for any PG is reached, controller 102 can initiate a first move from a source PG with a highest write count (or target PG with a lowest write count) to the spare PG.

In some embodiments, physical commands are processed in order (e.g., in order of receiving associated host commands). In those embodiments, controller 102 can read data from the source PG and copy to the spare PG. Generally, all host reads are directed to the source PG, and all writes to the source PG can be also written to the spare PG. Controller 102 can track all reads to the source PG since the move of data of the source PG to the spare PG has initiated. A counter can be implemented that increments with a read command and decrements when the read is completed. Once all data is moved from the source PG to the spare PG, controller 102 can change the L2P table entry corresponding to an associated LG to point to the spare PG. Controller 102 can wait until all reads to the source PG since the move was initiated are completed, which can be determined by the counter reaching zero. In response, controller 102 can initiate a move of data from the target PG to the source PG in a manner similar to the move of data from the source PG to the spare PG. It is understood that waiting for all reads to the source PG to complete prior to beginning the move of data from the target PG to the source PG can be significant. For example, if there are still some read commands in the PCMD queue for the source PG, then swapping data from the target PG to the source PG could result in incorrect data being served for those reads.

In some embodiments, physical command re-ordering can be allowed, which can be distinct from the previous paragraph in which physical commands are processed in order. In these embodiments, a read of data might be re-order to come before a write of the data even though the host sent the write command before the read command. For example, when physical commands are processed out of order, controller 102 can keep track of commands in the pipe. In some embodiments, commands can have a phase, and controller 102 can keep track of commands having a same phase and the completion of each phase. For a source PG, when a given high threshold is reached, controller 102 can flip the phase and wait for completion of all commands having the other phase. Upon completion, controller 102 can read data from source PG and copy that data to the spare PG. All host reads can be directed to the source PG and all host writes to the source PG can be directed instead to the spare PG. Once all data is moved from the source PG to the spare PG, controller 102 can change the L2P table entry corresponding to a LG such that the LGI points to the spare PG. Controller 102 can then flip the phase once more and wait for completion of all commands having the previous phase. Controller 102 can then initiate a move from the target PG to the source PG and move data from the spare PG to the source PG following the same or similar steps.

It should be understood that the above-mentioned different embodiments can have certain advantages. For example, a first embodiment that uses a counter can utilize a counter that only keeps track of reads to the PG with data that is being moved. Hence, the time to wait for completion will typically be shorter relative to a second embodiment that uses phases. Since these processes and waits can all be performed in the background and happen infrequently, the extra waits in the second embodiment are not detrimental to system performance. In the second embodiment, waits can be longer since the phase relates to all commands and not just commands in the pipe before switching the phase are completed. The second embodiment can work either in embodiments that re-order physical commands or embodiments that maintain the physical command order.

The diagrams included herein are described with respect to interaction between several components, or memory architectures. It should be appreciated that such diagrams can include those components and architectures specified therein, some of the specified components/architectures, and/or additional components/architectures. Sub-components can also be implemented as electrically connected to other sub-components rather than included within a parent architecture. Additionally, it is noted that one or more disclosed processes can be combined into a single process providing aggregate functionality. For instance, a program process can comprise an erase process, or vice versa, to facilitate programming and erasing a semiconductor cell by way of a single process. In addition, it should be appreciated that respective rows of multiple cell memory architectures can be erased in groups (e.g., multiple rows erased concurrently) or individually. Moreover, it should be appreciated that multiple memory cells on a particular row can be programmed in groups (e.g., multiple memory cells programmed concurrently) or individually. Components of the disclosed architectures can also interact with one or more other components not specifically described herein but known by those of skill in the art.

Figure 8:
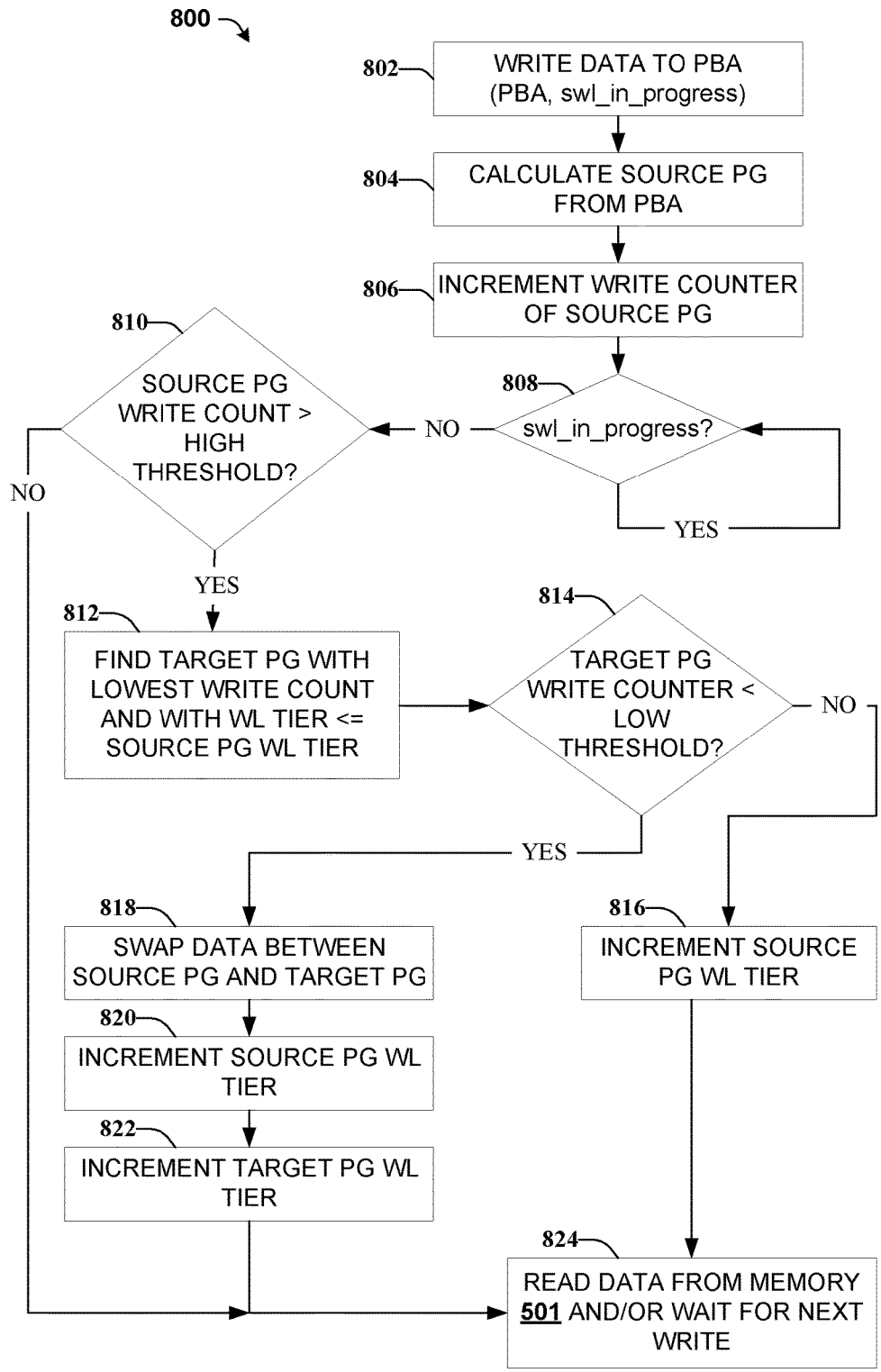
FIG. 8 illustrates an example flow diagram that provides an example procedure or method flow in connection with static wear leveling for TTM in accordance with certain embodiments of this disclosure.

In view of the exemplary diagrams described supra, process methods that can be implemented in accordance with the disclosed subject matter will be better appreciated with reference to the flow charts of FIG. 8. While for purposes of simplicity of explanation, the methods of FIG. 8 are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Additionally, it should be further appreciated that the methods disclosed throughout this specification are capable of being stored on an article of manufacture to facilitate transporting and transferring such methodologies to an electronic device. The term article of manufacture, as used, is intended to encompass a computer program accessible from any computer-readable device, device in conjunction with a carrier, or storage medium.

Turning now to FIG. 8, flow diagram 800 is illustrated. Flow diagram 800 provides an example procedure or method flow in connection with static wear leveling for TTM. For example at reference numeral 802, data can be written to a PBA. At reference numeral 804, a source PG can be calculated from the address of the PBA. At reference numeral 806, a write counter of the source PG can be incremented (e.g., increased by one). Reference numeral 808 represents a decision block in which it can be determined whether the static wear leveling associated with reference numeral 802 is still in progress. If so, then method 800 can wait. If not, then method can proceed to reference numeral 810.

At reference numeral 810, it can be determined whether the source PG has a write count that is greater than a high threshold value of an associated SWL table. If not, then method 800 can proceed to reference numeral 824. If so, the method can proceed to reference numeral 812. At reference numeral 812, a target PG from the same tier (e.g., tier value) or lower tier and with a lowest write count can be found.

At reference numeral 814, the write count of the target PG can be compared with a low threshold value of the SWL table. If the write count is greater, then method 800 can proceed to reference numeral 816. If the write count is less than the low threshold value, then method 800 can proceed to reference numeral 818. At reference numeral 816, the source PG wear leveling tier (e.g., TIDS value) can be incremented and method 800 can proceed to reference numeral 824. Such represents the case in which the source PG triggered a data swap, but no suitable target was available. So, the source PG can be moved to a higher tier without swapping.

On the other hand, at reference numeral 818, data is swapped between the source PG and the target PG. At reference numeral 820, the WL tier value of the source PG can be incremented and at reference numeral 822, the WL tier value of the target PG can be incremented as well. At reference numeral 824, data can be read from memory and/or wait for next write operation.

Example Operating Environments

Figure 9:
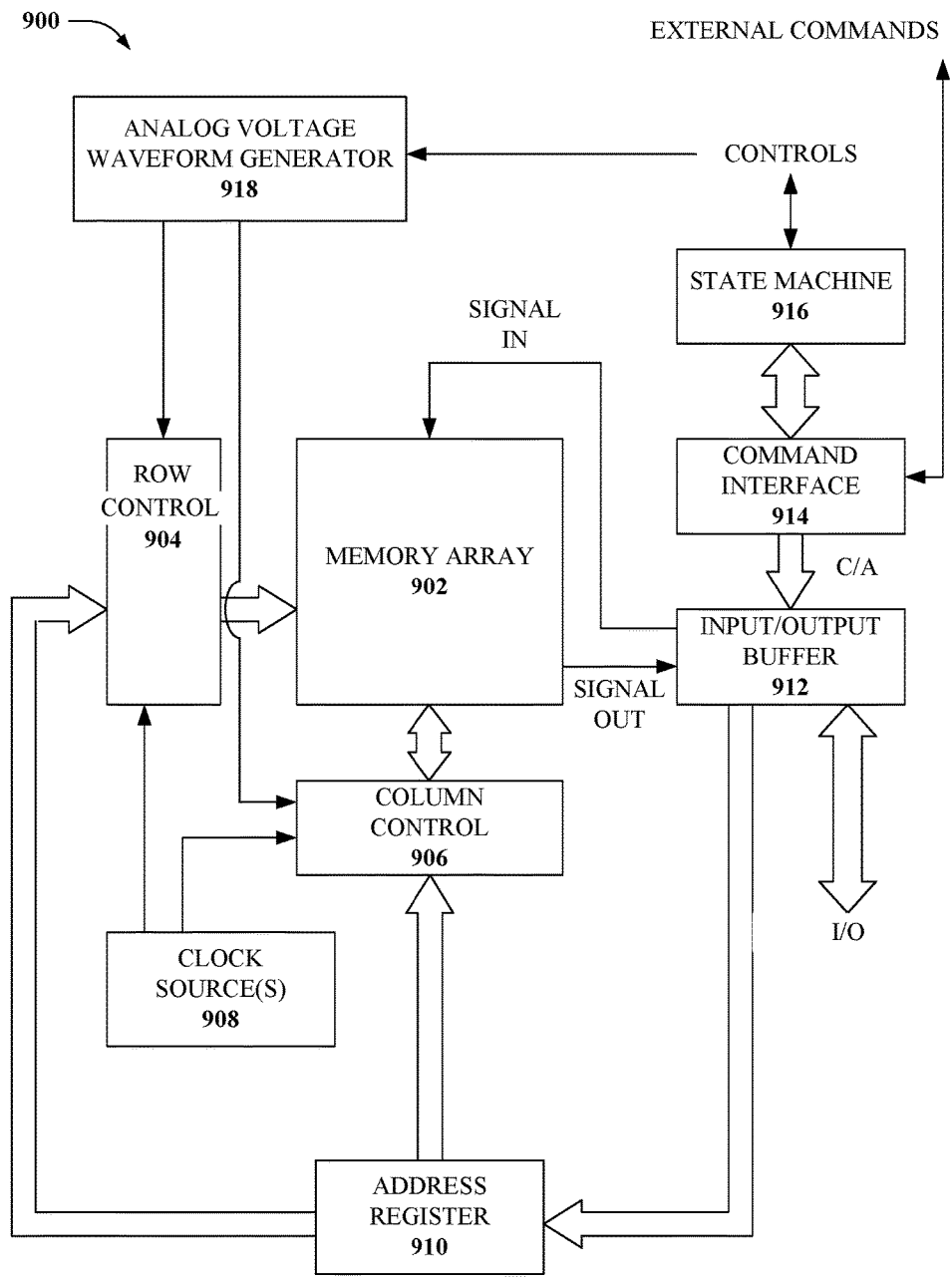
FIG. 9 illustrates a block diagram of an example electronic operating environment in accordance with certain embodiments of this disclosure.

FIG. 9 illustrates a block diagram of an example operating and control environment 900 for a memory cell array 902 according to aspects of the subject disclosure. In at least one aspect of the subject disclosure, memory cell array 902 can comprise a variety of memory cell technology. Particularly, memory cell array 902 can comprise two-terminal memory such as resistive memory cells with a non-volatile memory device and a volatile selector device, as described herein.

A column controller 906 can be formed adjacent to memory cell array 902. Moreover, column controller 906 can be electrically coupled with bit lines of memory cell array 902. Column controller 906 can control respective bitlines, applying suitable program, erase or read voltages to selected bitlines.

In addition, operating and control environment 900 can comprise a row controller 904. Row controller 904 can be formed adjacent to column controller 906, and electrically connected with word lines of memory cell array 902. Row controller 904 can select particular rows of memory cells with a suitable selection voltage. Moreover, row controller 904 can facilitate program, erase or read operations by applying suitable voltages at selected word lines.

A clock source(s) 908 can provide respective clock pulses to facilitate timing for read, write, and program operations of row control 904 and column control 906. Clock source(s) 908 can further facilitate selection of word lines or bit lines in response to external or internal commands received by operating and control environment 900. An input/output buffer 912 can be connected to an external host apparatus, such as a computer or other processing device (not depicted) by way of an I/O buffer or other I/O communication interface. Input/output buffer 912 can be configured to receive write data, receive an erase instruction, output readout data, and receive address data and command data, as well as address data for respective instructions. Address data can be transferred to row controller 904 and column controller 906 by an address register 910. In addition, input data is transmitted to memory cell array 902 via signal input lines, and output data is received from memory cell array 902 via signal output lines. Input data can be received from the host apparatus, and output data can be delivered to the host apparatus via the I/O buffer.

Commands received from the host apparatus can be provided to a command interface 914. Command interface 914 can be configured to receive external control signals from the host apparatus, and determine whether data input to the input/output buffer 912 is write data, a command, or an address. Input commands can be transferred to a state machine 916.

State machine 916 can be configured to manage programming and reprogramming of memory cell array 902. State machine 916 receives commands from the host apparatus via input/output interface 912 and command interface 914, and manages read, write, erase, data input, data output, and like functionality associated with memory cell array 902. In some aspects, state machine 916 can send and receive acknowledgments and negative acknowledgments regarding successful receipt or execution of various commands.

In an embodiment, state machine 916 can control an analog voltage waveform generator 918 that provides read/write and program/erase signals to row control 904 and column control 906.

To implement read, write, erase, input, output, etc., functionality, state machine 916 can control clock source(s) 908. Control of clock source(s) 908 can cause output pulses configured to facilitate row controller 904 and column controller 906 implementing the particular functionality. Output pulses can be transferred to selected bit lines by column controller 906, for instance, or word lines by row controller 904, for instance.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more IC chips. For example, in one embodiment, a set of components can be implemented in a single IC chip. In other embodiments, one or more respective components are fabricated or implemented on separate IC chips.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
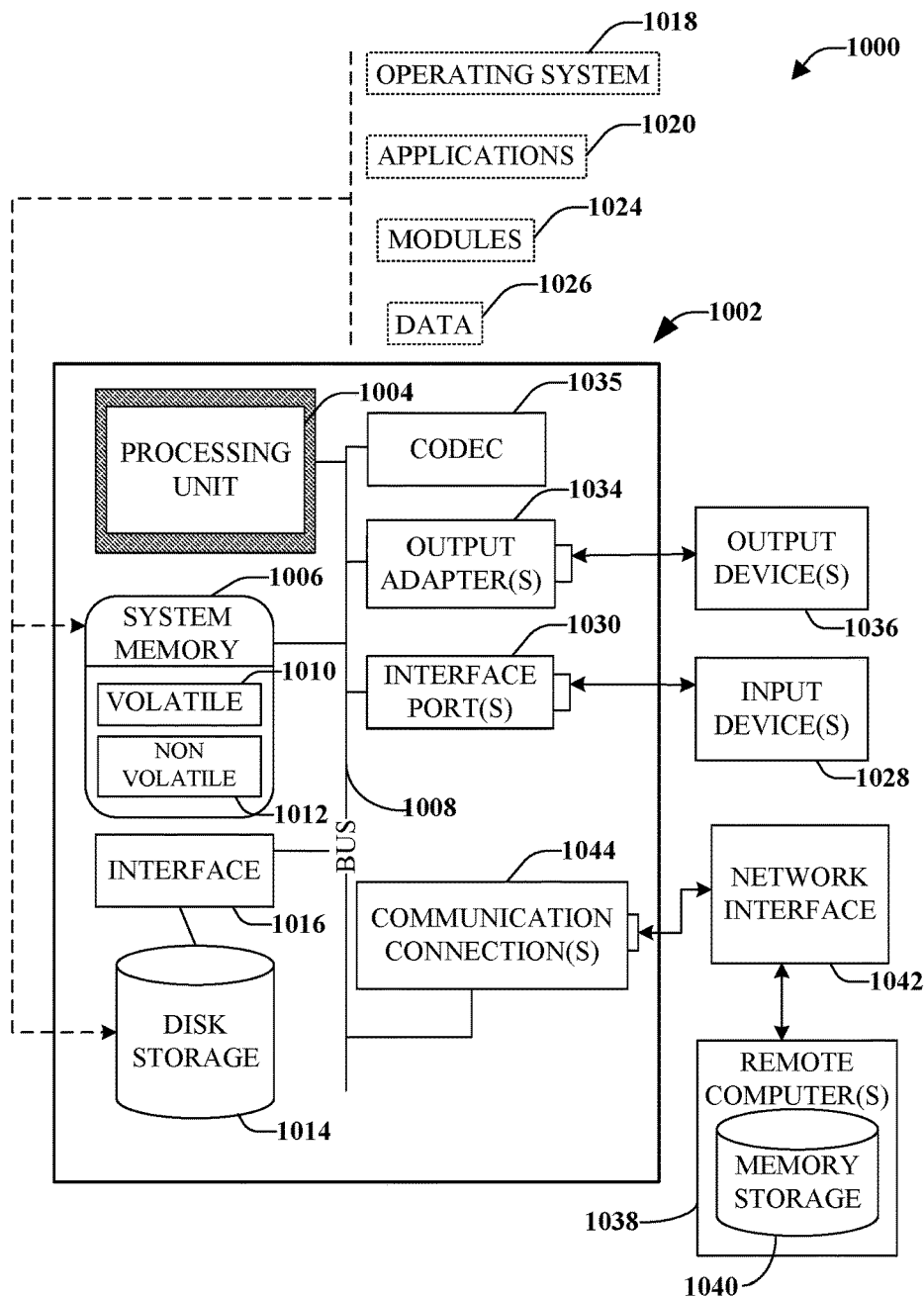
FIG. 10 illustrates a block diagram of an example computing environment in accordance with certain embodiments of this disclosure.

With reference to FIG. 10, a suitable environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 may include at least one of an encoder or decoder, wherein the at least one of an encoder or decoder may consist of hardware, software, or a combination of hardware and software. Although, codec 1035 is depicted as a separate component, codec 1035 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or Flash memory. Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, replicating, mimicking, determining, or transmitting, and the like, refer to the action and processes of processing systems, and/or similar consumer or industrial electronic devices or machines, that manipulate or transform data or signals represented as physical (electrical or electronic) quantities within the circuits, registers or memories of the electronic device(s), into other data or signals similarly represented as physical quantities within the machine or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A memory device, comprising:
   a first memory that stores a logical-to-physical (L2P) table that maps a logical group identifier (LGI) to a physical group identifier (PGI), wherein the PGI identifies a physical group (PG) among PGs of a second memory comprising non-volatile two-terminal memory, and wherein the PGs respectively comprise multiple physical block addresses (PBAs) that address respective blocks of the second memory;
   a controller, operatively coupled to the first memory and the second memory, that facilitates performance of operations that provide a wear leveling procedure, wherein the operations comprise:
     determining that a block of data has been written to a PBA of the multiple PBAs;
     determining the PG that comprises the PBA; and
     updating write counter data comprising incrementing a write counter data structure (WCDS) value of the write counter data, wherein the WCDS value is representative of a count of writes to the PG of the second memory, wherein:
       the write counter data further comprises a tier index data structure (TIDS) representative of a wear leveling tier of the count of writes to the PG, and the wear leveling tier is defined within a static wear leveling (SWL) table comprising wear leveling tiers including the wear leveling tier, and that defines a high count threshold corresponding to the wear leveling tier and a low count threshold corresponding to the wear leveling tier.

2. The memory device of claim 1, wherein the respective blocks of the second memory comprise one or more pages.

3. The memory device of claim 1, wherein the first memory is monolithically integrated into the controller, and wherein the second memory comprising non-volatile two-terminal memory is configured to support an in-place over-write of information characterized as updating a state of a memory cell without erasing the memory cell or without changing a L2P mapping of the memory cell.

4. The memory device of claim 1, wherein the second memory comprises the SWL table, and wherein the SWL table further defines respective high count thresholds corresponding to each of the wear leveling tiers, and defines respective low count thresholds corresponding to each of the wear leveling tiers.

5. The memory device of claim 4, wherein the operations further comprise, in response to updating first write counter data corresponding to a first PG, determining that first write count data corresponding to the first PG has a first wear leveling tier indicated by a first TIDS and a first write count indicated by a first WCDS value that exceeds a first high count threshold of the first wear leveling tier indicated by the SWL table.

6. The memory device of claim 5, wherein the operations further comprise, in response to the determining the first write count exceeds the first high count threshold, identifying a second PG that corresponds to second write counter data having a second TIDS with a second wear leveling tier that is less than or equal to the first wear leveling tier and having a second WCDS value representative of a second count of writes to the second PG.

7. The memory device of claim 6, wherein the operations further comprise, in response to the second count being determined to be greater than a first low count threshold indicated by the SWL table, updating the first TIDS comprising incrementing the first wear leveling tier.

8. The memory device of claim 6, wherein the operations further comprise, in response to the second count being determined to be less than a first low count threshold indicated by the SLW table, performing a swap procedure that swaps first data stored at the first PG with second data stored at the second PG and that updates the L2P table comprising updating a first LGI that maps to a first PGI corresponding to the first PG to map to a second PGI corresponding to the second PG and updating a second LGI that maps to the second PGI to map to the first PGI.

9. The memory device of claim 8, wherein the operations further comprise updating the first TIDS comprising incrementing the first wear leveling tier and updating the second TIDS comprising incrementing the second wear leveling tier.

10. The memory device of claim 8, wherein the operations further comprise updating the first WCDS value comprising incrementing the first write count and updating the second WCDS value comprising incrementing the second write count.

11. The memory device of claim 4, wherein the operations further comprise updating the SWL table based on an optimization procedure that determines improved values based on analysis data collected during operation of the memory device, wherein the improved values represent values for one selected from a group consisting of the high count thresholds, the low count thresholds, and the wear leveling tiers.

12. The memory device of claim 1, wherein the high count threshold or the low count threshold is determined from a product of a write count threshold number associated with the high count threshold or the low count threshold, and a group size number of the PG.

13. The memory device of claim 12, wherein the group size number of the PG is defined as a number of physical block addresses PBAs within the PG of the second memory.

14. A method of wear leveling in connection with two-terminal memory, comprising:
communicating, by a controller, with a first memory and a second memory, wherein the first memory stores a logical-to-physical (L2P) table that maps a logical group identifier (LGI) to a physical group identifier (PGI), wherein the PGI identifies a physical group (PG) among PGs of the second memory that comprises non-volatile two-terminal memory, and wherein the PGs respectively comprise multiple physical block addresses (PBAs) that address respective blocks of the second memory;
determining, by the controller, that a block of data has been written to a PBA of the multiple PBAs;
identifying, by the controller, the PG that comprises the PBA; and
updating, by the controller, write counter data comprising incrementing a write counter data structure (WCDS) value of the write counter data, wherein the WCDS value is representative of a count of writes to the PG of the second memory, wherein:
the write counter data further comprises a tier index data structure (TIDS) representative of a wear leveling tier of the count of writes to the PG, and
the second memory comprises a static wear leveling (SWL) table comprising wear leveling tiers including the wear leveling tier, high count thresholds including a high count threshold corresponding to the wear leveling tier, and low count thresholds including a low count threshold corresponding to the wear leveling tier.

15. The method of claim 14, wherein the respective blocks of the second memory comprise one or more pages, and wherein the second memory comprising non-volatile two-terminal memory is configured to support an in-place over-write of information characterized as updating a state of a memory cell without erasing the memory cell or without changing a L2P mapping of the memory cell.

16. The method of claim 14, wherein the first memory is monolithically integrated into the controller.

17. The method of claim 14, wherein the high count thresholds are defined by a set of high write count numbers assigned to the wear leveling tiers multiplied by a group size number of the PG.

18. The method of claim 14, wherein the operations further comprise, in response to updating first write counter data corresponding to a first PG, determining that first write count data corresponding to the first PG has a first wear leveling tier indicated by a first TIDS and a first write count indicated by a first WCDS value that exceeds a first high count threshold of the first wear leveling tier indicated by the SWL table.

19. The method of claim 18, wherein the operations further comprise, in response to the determining the first write count exceeds the first high count threshold, identifying a second PG that corresponds to second write counter data having a second TIDS with a second wear leveling tier that is less than or equal to the first wear leveling tier and having a second WCDS value representative of a second count of writes to the second PG.

20. The method of claim 19, wherein the operations further comprise, in response to the second count being determined to be greater than a first low count threshold indicated by the SWL table, updating the first TIDS comprising incrementing the first wear leveling tier.

* * * * *